No. 774,566. PATENTED NOV. 8, 1904.
R. COX.
INITIAL READING INDICATOR FOR SURVEYORS' INSTRUMENTS.
APPLICATION FILED APR. 18, 1904.
NO MODEL.

Witnesses
Edward L. Yewell
James F. Mansfield

Inventor
Rowland Cox.
By Alexander & Dowell
Attorneys

No. 774,566.

Patented November 8, 1904.

UNITED STATES PATENT OFFICE.

ROWLAND COX, OF TAYLORSVILLE, KENTUCKY.

INITIAL-READING INDICATOR FOR SURVEYORS' INSTRUMENTS.

SPECIFICATION forming part of Letters Patent No. 774,566, dated November 8, 1904.

Application filed April 18, 1904. Serial No. 203,704. (No model.)

*To all whom it may concern:*

Be it known that I, ROWLAND COX, of Taylorsville, in the county of Spencer and State of Kentucky, have invented certain new and useful Improvements in Initial-Reading Indicators for Surveyors' Instruments; and I hereby declare that the following is a full, clear, and exact description thereof, reference being had to the accompanying drawings, which form part of this specification.

This invention is an improvement in surveyors' instruments, and is an adjustable initial-reading indicator to be used on the compass or transit to keep conspicuously before the surveyor the degree he is to run through an entire line, so in setting up the transit or compass on intermediate points he does not have to refer to the deed for his course, as the indicator will show that and will prevent misreadings of the needle and also obviate the necessity of mental calculations of variations from original courses at each setting of transit or compass due to change of the magnetic pole at each reading.

The invention therefore consists in an adjustable corrector or indicator for the instrument, as hereinafter described and claimed.

In the accompanying drawings I have shown different kinds of indicators adapted to different instruments, all embodying the invention, which is summarized in the claims.

Figure 1:
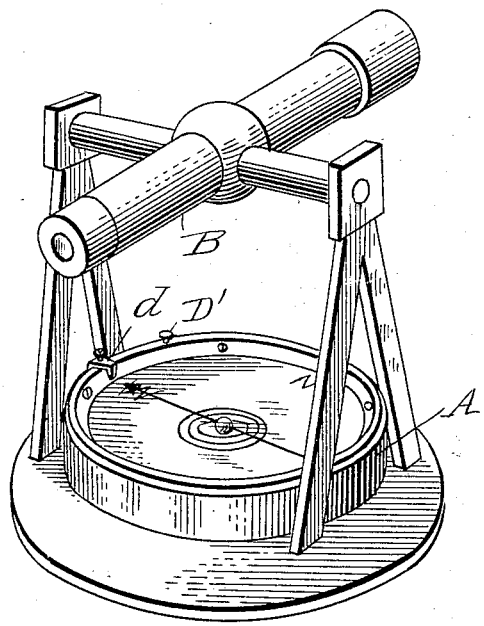
Figure 2:
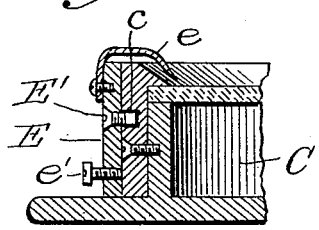
Figure 4:
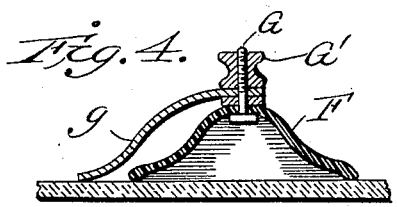
Figure 3:
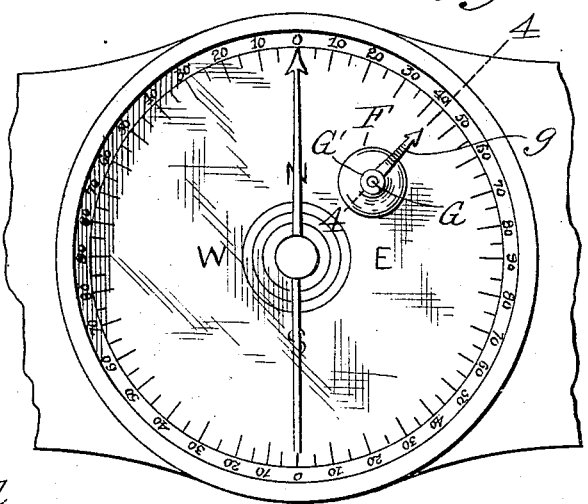
Figure 5:
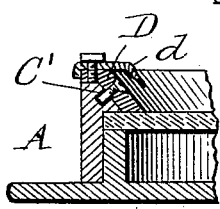

Referring to said drawings, Figure 1 is a view of a surveyor's transit with the initial-reading indicator attached. Fig. 2 is a detail view showing a modified construction of the initial-reading indicator. Fig. 3 is a plan view of a compass with a preferred form of a detachable initial-reading indicator. Fig. 4 is a detail section on line 4 4, Fig. 3. Fig. 5 is an enlarged detail section beside the indicator in Fig. 1.

In Fig. 1, A designates the compass-box, which is provided with the usual quadrant-scale, and B is the telescope, which is supported above the box, as usual, in the N. S. line of the quadrant. These parts are of ordinary construction and do not require detailed explanation. My indicator is attached to the compass-box, as follows: A circumferential groove C' is cut in the bezel-ring of the compass-box, (see Figs. 1 and 5,) and a rotatable ring D is fitted around this groove and is retained and guided thereby. This ring D carries an indicating-finger $d$, which points to the compass-scale. The indicator $d$ may be adjusted by rotating the ring D, and a thumb-screw D' may be tapped through the ring, so as to fasten it securely where adjusted, if desired. The mode of using the indicator will be explained hereinafter.

The indicator shown in Fig. 2 is much like that shown in Fig. 1, and comprises a ring E, rotatably attached to and around the top of the compass-box and having an indicator-finger $e$ and a fastening set-screw $e'$. The ring E may be rotatably and removably attached to the compass-box by means of sunken screws E', which engage a circumferential groove $c$ in box C.

The indicator shown in Figs. 3 and 4 is the simplest and may be applied to any compass instrument in use. It comprises a suction-bell F, preferably of rubber, which can be wetted and then pressed onto the compass-glass adjacent to the point on the scale where the indicator is to be used, and the pressure of the atmosphere will hold the bell securely to the glass. An indicating-pointer $g$ is pivoted on a threaded stem G, attached to the said bell, and after the indicator is properly adjusted it is fixed by screwing down the nut G'. The indicator can be removed by lifting one edge of the bell F from the glass, allowing the air to get thereunder. If desired, however, this indicator might be permanently attached to the compass-glass.

The manner of using the several indicators is as follows: The indicator is adjusted to point to the degree to be run and remains on this degree and prevents error in reading the needle. With the ordinary instruments frequent mistakes are made by the surveyor reading to the left of degrees when he should read to the right, as each quadrant is indexed "0, 10, 20, 30, 40, 50, 50, 60, 70, 80, 90," and between these figures are only short lines. If the surveyor wanted to read "N. 72 E.," for example, he should read in this case two lines left of "N. 70 E.;" but if it were "N. 72 W." he should read to the right two lines. This causes errors in running a long line, where the instrument has to be set several times and his attention is on his chainman and axman he is liable to read on the left of "N. 70 E.," which would make his reading "N. 68 E." instead of "N. 72 E.," and when he has a reading "S. E." and "S. W." he is still more liable to read to left instead of to the right.

Surveyors are ordinarily taught to balance their surveys by lengthening and shortening lines. The indicator is adjusted independent of the compass. In running a line the compass may have to be set a great many times, but the indicator remains where adjusted, and the surveyor does not have to refer to the deed on any line, provided that every time he sets the compass on such line he makes the needle point to indicator, thereby keeping it on the same degree along the whole line.

For variations the indicator is used as follows: For instance, in making a survey over courses run years ago and the variation has amounted to two degrees E., if the deed calls for "N. 70 E. 140 P." the surveyor would add the two degrees variation, making "N. 72 E. 140 P." set indicator to "N. 72 E." on compass and go ahead. He need not look any more at the deed till line is finished, as he has the place marked by the indicator, and if he makes the needle point to indicator it will carry him through all right. The indicator keeps him from misreading the degree, so he may give his attention to chainman and axmen.

The indicator is not only useful on surveys of land, but also in railroad location. On a railroad survey the line is started with the needle. If the first line was "N. 20 E." and the surveyor is to put in a one-degree curve to right for ten stations, which is ten degrees, the course of tangent will be "N. 30 E.," and he should place the indicator on "N. 30 E.," beginning of curve, run in the curve, throw off the tangent, and the needle will point to indicator "N. 30 E.," thereby checking the curve.

Having thus described my invention, what I therefore claim as new, and desire to secure by Letters Patent thereon, is—

1. In a surveyor's compass or transit, the combination with the compass and its scale or quadrant, of an indicator adapted to be adjusted to any desired point on the scale and to insure correct readings when the instrument is shifted so that the needle points to said indicator, substantially as described.

2. In a surveyor's compass or transit, the combination with the compass and its scale or quadrant of an adjustable indicator, and means for directing said indicator to any desired point on the compass scale or quadrant, said indicator being movable with said scale, and adapted to insure correct readings when the instrument is shifted so that the needle points to said indicator, substantially as described.

3. In combination with a surveyor's compass or transit, a detachable indicator adapted to be attached to the compass-glass, and having an indicating-finger adjustably attached thereto, and means for fastening said finger relative to any degree on the compass scale or quadrant, whereby correct readings are insured when the instrument is shifted until the needle points to said indicator, substantially as described.

In testimony that I claim the foregoing as my own I affix my signature in presence of two witnesses.

ROWLAND COX.

In presence of—
JAMES E. CLEVELAND,
JAMES R. MARATLEY.